United States Patent
Ahn

[19]

[11] Patent Number: 6,116,742
[45] Date of Patent: Sep. 12, 2000

[54] OUTSIDE REAR VIEW MIRROR FOR USE IN A VEHICLE CAPABLE OF AUTOMATICALLY CONTROLLING A RANGE OF OBSERVATION

[76] Inventor: Moon-Hwi Ahn, #104-106, Hyundai Apt. 1255-8, Naun 2-dong, Kunsan, Chollabuk-do, 573-352, Rep. of Korea

[21] Appl. No.: 09/373,540

[22] Filed: Aug. 13, 1999

[30] Foreign Application Priority Data

Aug. 14, 1998 [KR] Rep. of Korea ...................... 98-15271

[51] Int. Cl.[7] ...................................................... G02B 5/08
[52] U.S. Cl. ............................................................ 359/843
[58] Field of Search ................................... 359/841, 843, 359/872, 877

[56] References Cited

U.S. PATENT DOCUMENTS

| 4,971,430 | 11/1990 | Lynas | 359/843 |
|---|---|---|---|
| 5,035,496 | 7/1991 | An . | |
| 5,325,096 | 6/1994 | Pakett | 342/70 |
| 5,737,136 | 4/1998 | Boggiatto | 359/843 |
| 5,786,772 | 7/1990 | Schofield et al. | 340/903 |

FOREIGN PATENT DOCUMENTS 69871  8/1992  Rep. of Korea .

*Primary Examiner*—Cassandra Spyrou
*Assistant Examiner*—Mark A. Robinson

[57] ABSTRACT

An outside rear view mirror device includes a winker lever outputting a predetermined turn-signal, when it is operated by a driver, a detecting sensor attached on a surface of a mirror case to detect if an automobile is positioned in a rear side of the driver's automobile. The devide also includes a controller for actuating a solenoid when it receives the turn-signal or a signal from the detecting sensor, whereby an angular position of the mirror is automatically is adjusted, when the winker lever is operated or an automobile is detected in the rear side of the driver's automobile.

1 Claim, 2 Drawing Sheets

OUTSIDE REAR VIEW MIRROR FOR USE IN A VEHICLE CAPABLE OF AUTOMATICALLY CONTROLLING A RANGE OF OBSERVATION

FIELD OF THE INVENTION

The present invention relates to an outside rear view mirror for use in an automobile; and, more particularly, to an outside rear view mirror device capable of automatically controlling a range of observation of a mirror when the automobile changes its proceeding direction and a traffic lane or when it passes along a principal road connected with its running road and along a ramp.

DESCRIPTION OF THE PRIOR ART

One of the prior art outside rear view mirror devices is shown in Korean Utility Model No. 69871 (its application No. 90-3320), entitled "OUTSIDE REAR VIEW MIRROR DEVICE CAPABLE OF AUTOMATICALLY ENLARGEDLY CONTROLLING A RANGE OF REFLECTION OF A MIRROR". In the prior art, the range of driver's observation through the rear view mirror is enlarged to give more accurate information on the surroundings of the rear side of the vehicle, when the mirror is moved within a predetermined angular range by the driver's actuating a winker lever mounted to a steering wheel. This is made when the automobile or vehicle comes out to its travelling road from a ramp or when a traffic lane is changed.

The prior art described above, however, has several shortcomings in that the movement of the mirror is triggered by manually actuating the winker lever. For example, there's much possibility for the driver to make a traffic lane change without actuating the winker lever. Furthermore, it is somewhat cumbersome to manually trigger the movement of the mirror.

SUMMARY OF THE INVENTION

It is, therefore, a primary object of the invention to provide an outside rear view mirror device in which a movement of a mirror can be triggered by both manual and automatic method, wherein the automatic method is based on a rear traffic condition or surroundings of the automobile.

Another object of the present invention is to provide an outside rear view mirror device for use in an automobile having a mirror mounted in a case and being angularly movable by a solenoid, the device comprising: a winker lever outputting a predetermined turn-signal, when operated by a driver; a detecting sensor attached on a surface of the case to detect if an automobile is positioned in the rear side of the driver's automobile; and a controller for actuating the solenoid when it receives the turn-signal or a signal from the detecting sensor; whereby an angular position of the mirror is automatically is adjusted, when the winker lever is operated or an automobile is detected in the rear side of the driver's automobile.

BRIEF DESCRIPTION OF THE DRAWINGS

The above and other objects and features of the instant invention will become apparent from the following description of preferred embodiments taken in conjunction with the accompanying drawings, in which.

DETAILED DESCRIPTION OF THE PREFERRED EMBODIMENTS

A preferred embodiment of an inventive outside rear view mirror is now described with reference to accompanying drawings.

Figure 1:
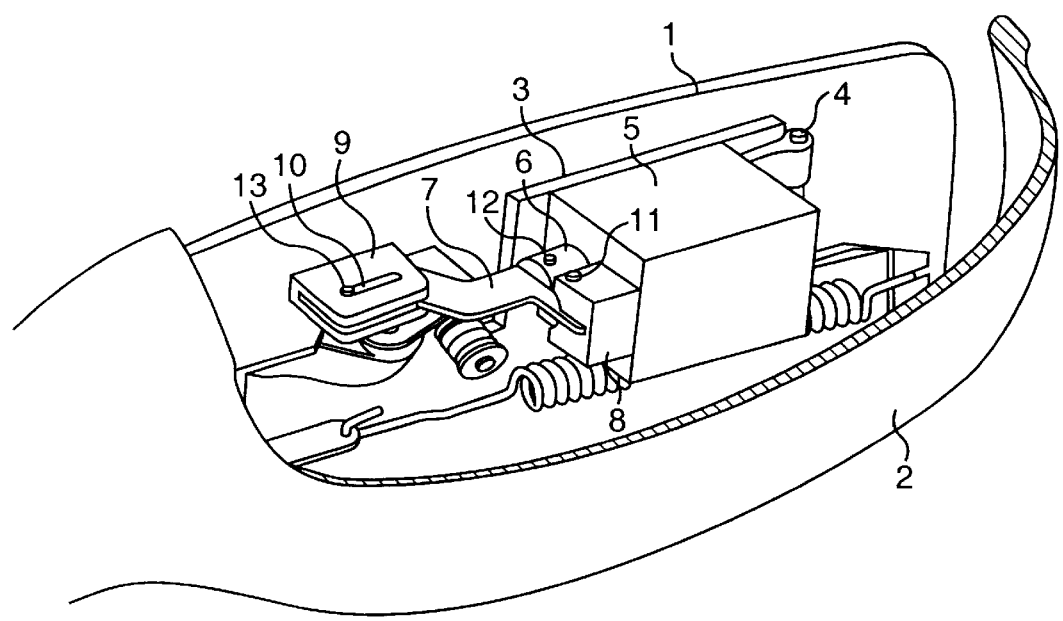
FIG. 1 illustrates a partially cut-away perspective view of an outside rear view mirror assembly in accordance with the present invention.

Referring to FIG. 1, the inventive outside rear view mirror device includes an electronic controller 40 fixed in a case 2, a mirror 1 arranged in front of the electronic controller 40 when viewed from an opening of the case 2 and rotatably mounted to a hinge 4 at its one end, while having a guide plate 9 with a sliding groove 10 at the other end.

The inventive device also includes a solenoid 5 having a frame 8 and a flanger 6 which protrude from one part of the solenoid 5 and have rotating shafts 11 and 12, respectively, which vertically extend. The solenoid 5 is fixed on one surface of the electronic controller 40.

The inventive device further includes a connecting rod 7 of a curved elongated shape which has at its one end a through-hole into which the rotating shaft 12 is mounted, and a slider pin 13 formed at the other end to be mounted into the sliding groove 10 of the guide plate 9. The connecting rod 7 also has a lever-shaped member protruding therefrom to come into contact with the rotating shaft 11.

On the other hand, the solenoid 5 is actuated by the electronic controller 40 which is triggered by both a trigger signal occurring when a winker lever (not shown) mounted to a steering wheel is operated and a signal from a detecting sensor 30.

Figure 2:
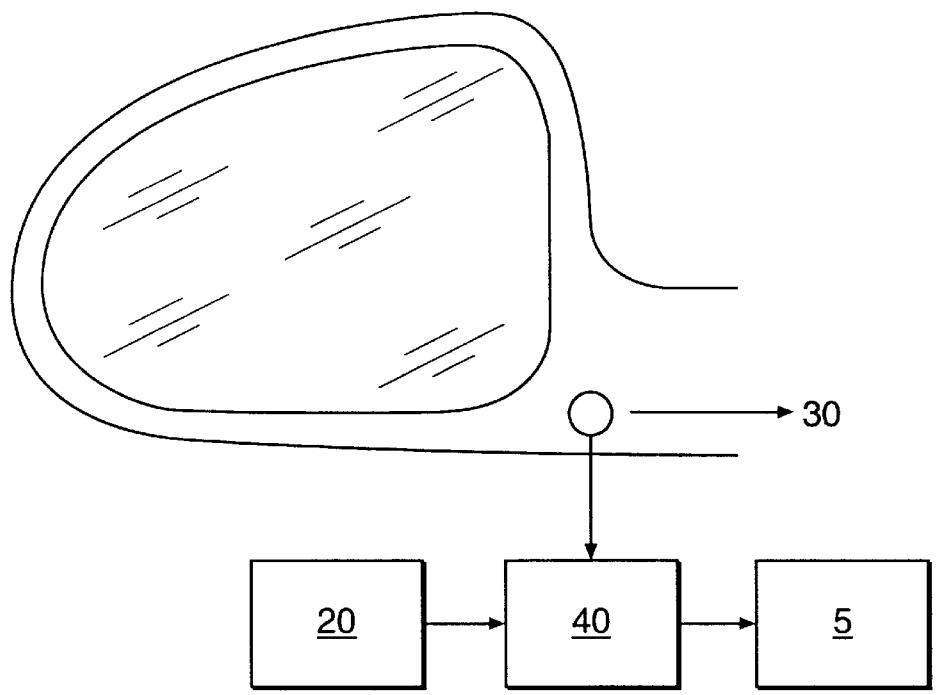
FIG. 2 shows a block diagram of the present invention.

In accordance with the present invention, the detecting sensor 30 is incorporated in the outside rear view mirror device described above and operated in such a manner that an angular position of the mirror 1 mounted in the case 2 is adjusted by the solenoid 5 through the electronic controller 40. The detecting sensor 30 is attached on a surface of the case 2 facing a rear side of the vehicle, as shown in FIG. 2, and connected to the electronic controller 40, so that, when any vehicle positioned rear the driver's vehicle comes in a detection range of the detecting sensor 30, the solenoid 5 is automatically actuated to angularly move the mirror 1 by a predetermined angle through the electronic controller 40, thereby maximizing the range of observation of the driver. A variety of forms and types of sensors, e.g., an ultra-sonic sensor or the like, are available as the detecting sensor 30; and various modification on the position of the sensor 30 may be made.

In the present invention constructed in this manner, the signal from the detecting sensor 30 actuates the solenoid 5 through the electronic controller 40, if any vehicle positioned rear the driver's vehicle comes in the detection range of the detecting sensor 30 mounted on the case 2 during running of the driver's vehicle. As a result, the mirror 1 is moved by a predetermined angle in a well known manner in the art, maximizing the range of observation of the driver so that the driver can ascertain surroundings of the rear side of the vehicle including the blind spot to allow the driver to make a safe traffic lane change or temporary stop. The changed angular position of the mirror 1 is maintained for a given period of time, as is well known in the art, and then the mirror 1 returns to its initial position.

Figure 3:
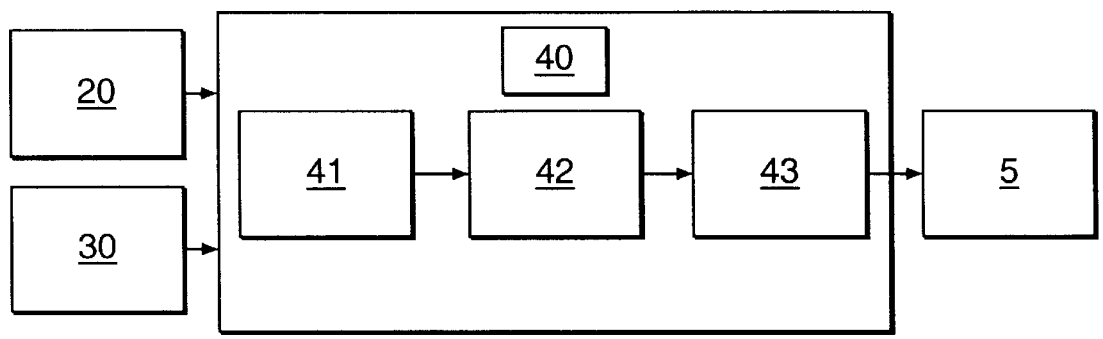
FIG. 3 depicts a block diagram of a whole system of the present invention using an ultra-sonic sensor for detecting a vehicle in the rear side of the driver's vehicle.

FIG. 3 shows the electronic controller 40 provided with a signal processing portion 41, a micro processor 42 and a power supply 43. The signal processing portion 41 generates a signal for driving the detecting sensor 30 and processes the trigger signal. It should be understood that various forms of the signal processing portion 41 be available depending upon the kind of the detecting sensor 30. The micro processor 41 performs a variety of functions by using signals from the signal processing portion 41, e.g., algorithm for determining if a vehicle exists in the rear side of the driver's vehicle, etc., or functions as an operation timer for the mirror 1. The power supply 43 includes a power transformer required to drive the solenoid 5 depending upon signals from the micro processor 42. The electronic controller 40 constructed in this manner may be installed within the case 2 or the vehicle, since it can be manufactured in a small and light-weight shape.

The present invention provides increased convenience and performance, since it is designed to be manually and automatically operable in such a manner that the solenoid can be actuated by both the operation of the winker lever and the signal from the detecting sensor.

Although the invention has been shown and described with respect to the preferred embodiments, it will be understood by those skilled in the art that various changes and modifications may be made without departing from the spirit and scope of the invention as defined in the following claims.

What is claimed is:

1. An outside rear view mirror device for use in an automobile having a mirror mounted in a case and being angularly movable by a solenoid, the device comprising:

a winker lever outputting a predetermined turn-signal, when operated by a driver;

a detecting sensor attached on a surface of the case to detect if a vehicle is positioned in the rear side of the automobile; and a controller for actuating the solenoid when it receives the turn-signal or a signal from the detecting sensor;

whereby an angular position of the mirror is automatically is adjusted, when the winker lever is operated or an automobile is detected in the rear side of the driver's automobile.

* * * * *